United States Patent [19]
Itoh

[11] Patent Number: 5,467,430
[45] Date of Patent: * Nov. 14, 1995

[54] ROBOT CONTROLLING METHOD AND APPARATUS

[75] Inventor: Atsushi Itoh, Aichi, Japan

[73] Assignee: Mitsubishi Denki Kabushiki Kaisha, Tokyo, Japan

[ * ] Notice: The portion of the term of this patent subsequent to Jul. 5, 2011, has been disclaimed.

[21] Appl. No.: 207,599

[22] Filed: Mar. 9, 1994

Related U.S. Application Data

[63] Continuation of Ser. No. 783,972, Oct. 29, 1991, Pat. No. 5,327,523.

[30] Foreign Application Priority Data

Oct. 29, 1990 [JP] Japan ................................ 2-291099
Sep. 30, 1991 [JP] Japan ................................ 3-252119

[51] Int. Cl.⁶ ............................................. G05B 19/407
[52] U.S. Cl. ............................................. 395/95
[58] Field of Search ....................... 395/84, 87, 95, 395/97

[56] References Cited

U.S. PATENT DOCUMENTS

| | | | |
|---|---|---|---|
| 4,546,443 | 10/1985 | Oguchi et al. | 395/84 |
| 4,625,285 | 11/1986 | Mori et al. | 395/84 |
| 4,712,183 | 12/1987 | Shiroshita et al. | 395/97 |
| 4,773,025 | 9/1988 | Penkar et al. | 395/84 |
| 4,868,474 | 9/1989 | Lancraft et al. | 395/84 |

Primary Examiner—Robert W. Downs
Attorney, Agent, or Firm—Sughrue, Mion, Zinn, Macpeak & Seas; Richard C. Turner; George F. Lehnigk

[57] ABSTRACT

A multi-axis robot and controller therefor which is responsive to the input of target position information for each of plural axes and outputs position commands to motors for each axis of the robot. All of the axes are considered together and are assumed to move according to the same velocity profile, the fastest velocity is identified and used as the basis for assigning a relative load factor to each axis. An actual velocity command for movement of each axis according to the input target position is calculated on the basis of the preceeding position command, its load factor, velocity profile and interpolated velocity value. The position command is calculated on the basis of the velocity command. The controlled axes may include additional outside axes and the load factor may be variable.

8 Claims, 5 Drawing Sheets

ROBOT CONTROLLING METHOD AND APPARATUS

This is a continuation of application Ser. No. 07/783,972, filed Oct. 29, 1991, now U.S. Pat. No. 5,327,523.

BACKGROUND OF THE INVENTION

1. Field of the Invention

The present invention relates to a robot controlling apparatus and method therefor, and more particularly to a robot controlling apparatus and method which can simplify calculations of velocity commands.

2. Description of the Background Art

An example of a robot controlling apparatus known in the art is shown in FIG. 6, wherein a program and data storage section 1 is used for storing user-written programs and position variable data generated by teaching or manual data input. An instruction decoder section 2 is connected for decoding the instructions of a program read from the program storage section 1, and supplying decoded instructions to a target position generator section 3, which generates a position variable $\theta_{id}$ which represents a target position when the instruction decoded is concerned with a traveling operation. Each axis i of a robot R may be separately identified, e.g. i=1, 2, 3, 4, 5, 6 for a six-axis robot. The movement of the robot along each axis is specified in terms of a rotational movement for purposes of explanation, since movement ordinarily is provided by a motor.

A position controller 54, comprising a permissible axis travel velocity generator section 55 for generating a permissible axis travel velocity $\omega_i$, a velocity command generator section 56 for generating a velocity command $d\theta_i$ for each axis at intervals of $\Delta t$ time, and a position command generator section 7 that is responsive to the velocity command $d\theta_i$, is operative to generate a position command $\theta_i$ at intervals of $\Delta t$ time. A coordinate converter section 8 converts the position command $\theta_i$ generated by the position controller 54 into an appropriate number of drive motor pulses $J_i$ for each axis of the robot R. A positioning controller section 9 is responsive to the number of drive motor pulses $J_i$ and positions each of the corresponding i axes of the robot R accordingly. A subtracter 10 is responsive to the target value $\theta_{id}$ and calculated value $\theta_{ic}$ output from command generator section 7 to generate a difference travel value $\Delta\theta_i$ for each axis.

The operation of the robot controlling apparatus will now be described. When a program is selected to be executed from among a plurality of programs stored in the program storage device 1, the instruction decoder section 2 initiates the decoding of instructions in that program. When information obtained by the instruction decoding is an instruction concerned with the traveling operation of the robot R, the instruction decoder section 2 commands the target position generator section 3 to generate a target position $\theta_{id}$. This command causes the target position generator section 3 to generate the target position $\theta_{id}$.

The permissible axis travel velocity generator section 55 in the position controller 54 calculates a permissible axis travel velocity $\omega_i$ from a maximum permissible axis angular velocity $\omega_{im}$ stipulated from the drive motor of each axis and an override factor (specified by a percentage of the maximum permissible angular velocity) Ov:

$$\omega_i = O_v \cdot \omega_{im} \tag{1}$$

The velocity command generator section 56 in the position controller 54 performs velocity control and locus control concerned with the traveling operation of the robot in accordance with the target position $\theta_{id}$ and permissible axis travel velocity $\omega_i$.

The velocity control and locus control are carried out by sampling control, i.e. the following processing is performed at certain time intervals $\Delta t$, generating the velocity command $d\theta_i$.

First, the travel value $\Delta\theta_i$ of each axis is calculated from the target position $\theta_{id}$ and a preceding position command $\theta_i$ (for convenience of explanation, this is represented as $\theta_{ic}$):

$$\Delta\theta_i = \theta_{id} - \theta_{ic} \tag{2}$$

Travel time $t_i$ of each axis is then calculated from the travel value $\Delta\theta_i$ and permissible axis travel velocity $\omega_i$ of each axis:

$$t_i = \Delta\theta_i / \omega_i \tag{3}$$

The maximum travel time for all axes is then identified:

$$t_m = max(t_i) \tag{4}$$

In the meantime, to start the travel of each axis simultaneously and terminate the travel at the same time, all the axes are moved with their respective travel values $\Delta\theta_i$ during that travel time $t_i$ which is a maximum value. Hence, the permissible axis travel velocity of each axis is compensated for to calculate a maximum axis interpolation velocity $V_i$:

$$V_i = \omega_i t_i / t_m \tag{5}$$

A velocity command $d\theta_i$ in the next $\Delta t$ time is then calculated from the given acceleration velocity $a_i$ and deceleration velocity $d_i$ of each axis and the maximum axis interpolation velocity $V_i$. Namely, supposing that the velocity of each axis is controlled as shown in FIG. 7 which illustrates acceleration/deceleration control, the next velocity command $d\theta_i$ is found as follows, judging from a preceding velocity command $d\theta_{ic}$ and the remaining travel value, if the area of the next velocity command $d\theta_i$ is an acceleration region:

$$d\theta_i = d\theta_{ic} + a_i \tag{6}$$

where an initial value is zero.
If that area is a constant-velocity region:

$$d\theta_i = V_i \tag{7}$$

If it is a deceleration region:

$$d\theta_i = d\theta_{ic} - d_i \tag{8}$$

The velocity command $d\theta_i$ is generated as described above.

The position command generator section 7 in the position controller 54 generates the position command $\theta_i$ of each axis in the next $\Delta t$ time according to the velocity command $d\theta_i$:

$$\theta_i = \theta_{ic} + d\theta_i \tag{9}$$

The coordinate converter section 8 converts the position command $\theta_i$ into the number of drive motor pulses Ji of each axis of the robot R and passes the result to the positioning controller section 9. The positioning controller section 9 outputs the number of drive motor pulses Ji of each axis to the motor of each axis of the robot R via a built-in digital-to-analog converter. This moves the robot R to the position of the position command $\theta_i$.

With the exception of expression (4), the expressions (1) to (9) are all those of vector calculation. That is, vector calculations are made a total of eight times per sampling. In the robot controlling apparatus of the backgound art, therefore, the greater the number of articulated axes that the robot has, the more calculations it has to make, taking much processing time. Also, where target positions in a three-dimensional space represented by a cartesian coordinate system are to be generated or target positions in a three-dimensional space represented by a cylindrical coordinate system are to be generated (interpolation in a three-dimensional space system), the robot cannot be controlled consistently since the concepts of interpolation velocities in such coordinate systems differ from each other. Further, control will be complex in an articulate mechanism where axis interference occurs.

As another related background art, a robot controlling process is disclosed in Japanese Patent Disclosure Publication No. 262212 of 1985. This controlling process determines a velocity by multiplying a maximum permissible velocity by a velocity factor calculated according to the parameters of a corner on the traveling path of a robot. However, the robot controlling process disclosed in Japanese Patent Disclosure Publication No. 262212/1985 is designed specifically for a traveling operation at a corner and is not appropriate for the control of a general traveling operation.

In the conventional robot controlling apparatus described as constructed above, calculations for velocity and position controls increase for a robot having many articulated axes, requiring much processing time. Further, when axes other than the robot's (additional axes) as well as the robot's axes are to be controlled by a single controlling apparatus, not only are the number of calculations increased but the travel paths of the robot axes must be synchronized with those of the additional axes.

SUMMARY OF THE INVENTION

It is accordingly an object of the present invention to overcome the disadvantages in the background art by providing a robot controlling apparatus and method which allows calculations to be simplified and velocity and position controls to be exercised easily.

Another object of the present invention is to provide a robot controlling apparatus and method that also allows calculations to be simplified and velocity and position controls to be carried out easily for additional axes, as where the robot includes both robot axes and such additional axes.

The first embodiment achieves a robot controlling apparatus and method that simplifies the positioning operation of each axis of a robot through the entry of the target position information of each axis, thereby facilitating velocity and position controls for a robot having many articulated axes. The first embodiment includes a position controller which defines the maximum value of the maximum permissible velocity of each axis of the robot as a maximum velocity character, calculates the load factor of each axis on the basis of the maximum velocity character, calculates the travel value of each axis from the target position information and preceding position command of said each axis, finds the travel distance of each axis from the travel value and load factor of each axis, defines the maximum value of travel distance as a typical travel distance, calculates a travel velocity character common to each axis from an acceleration velocity and a deceleration velocity common to each axis and a permissible interpolation travel velocity, calculates the velocity command of each axis from the travel velocity character and the travel value of the each axis, and calculates the position command of each axis on the basis of the velocity command of each axis.

The present invention achieves a robot controlling apparatus and method which simplifies the positioning operation of synchronizing additional axes with robot axes, facilitating velocity and position controls for a robot having additional axes besides the robot axes. The invention includes a position controller which outputs the position command of each of the robot axes and the additional axes through the entry of the target position information of each axis.

The invention also achieves a robot controlling apparatus that prevents excessive velocity in an articulated mechanism having interferable axes, facilitating velocity and position controls. The invention includes axis load factor changing means for changing the load factor of each axis comprising a plurality of robot axes or robot axes and additional axes. The invention also includes axis load factor changing means that changes the load factor of each operational axis, comprising any of a plurality of robot axes or a combination of robot axes and additional axes, on the basis of information on the axis interference of a robot.

DESCRIPTION OF THE PREFERRED EMBODIMENTS

Figure 1:
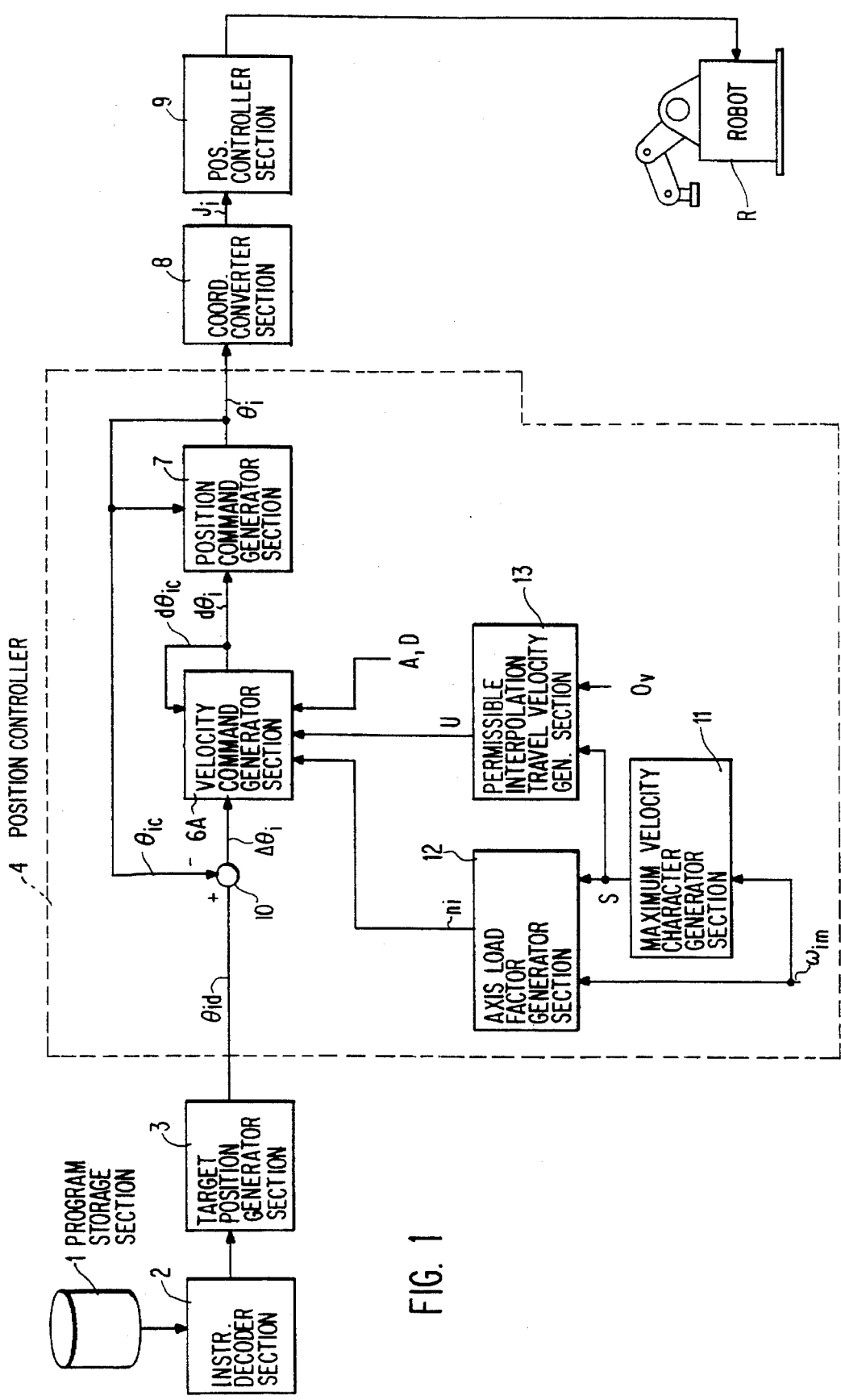
FIG. 1 is a block diagram of a robot controlling apparatus in accordance with a first preferred embodiment of the invention.

A first embodiment of the invention will now be described with reference to FIG. 1, wherein parts designated by reference characters in the background art indicate like or corresponding ones.

FIG. 1 is a block diagram showing the configuration of a robot controlling apparatus. Referring to FIG. 1, the numeral 4 indicates a position controller comprising a maximum velocity character generator section 11 for generating a maximum velocity character S, an axis load factor generator section 12 as axis load factor calculating means for generating the load factor $n_i$ of each axis, a permissible interpolation travel velocity generator section 13 as permissible interpolation travel velocity calculating means for generating a permissible interpolation travel velocity U, a velocity command generator section 6 as velocity command calculating means for generating a velocity command $d\theta_i$ for each axis at intervals of time $\Delta t$, and a position command generator section 7 as transmitted command calculating means for generating a position command $\theta_i$ at intervals of time $\Delta t$ on the basis of the velocity command $d\theta_i$. A subtracter 10 is used as a travel value calculator for outputting a difference between the target position information $\theta_{id}$ (hereinafter referred to as the "target position") of each axis generated by a target position generator section 3 and the position command $\theta_i$ of each axis output by the position command generator section 7 as the travel value $\Delta\theta_i$ of each axis in corresponding sampling synchronization.

The operation of the robot controlling apparatus according to the first embodiment will now be described. When a program is selected to be executed from among a plurality of programs stored in a program storage device 1, an instruction decoder section 2 initiates the decoding of instructions in that program. When information obtained by the instruction decoding is an instruction concerned with the traveling operation of the robot R, the instruction decoder section 2 commands the target position generator section 3 to generate a target position $\theta_{id}$. This command causes the target position generator section 3 to generate the target position $\theta_{id}$ as the target position information of each axis.

The maximum velocity character generator section 11 in the position controller 4 obtains a maximum velocity character S from the maximum value of a maximum permissible axis angular velocity $\omega_{im}$ stipulated for the drive motor of each axis.

$$S = \max\{\omega_{im}\} \tag{10}$$

The axis load factor generator section 12 in the position controller 4 calculates for each axis an axis load factor $n_i$ from the maximum permissible axis angular velocity $\omega_{im}$ and the maximum velocity character S.

$$n_i = S/\omega_{im} \tag{11}$$

The axis load factor $n_i$ is a non-dimensional quantity, representing a travel load (difficulty in moving) in the travel of each axis. The load factor will have a minimum value of 1 for the fastest axis and will have greater values for slower axes that move with greater difficulty.

The permissible interpolation travel velocity generator section 13 in the position controller 4 calculates a permissible interpolation travel velocity U from the maximum velocity character S and a specified override factor $O_v$. Note that this single calculation is relatively simple, as compared to the calculation in the background art which requires each axis to be considered.

$$U = O_v \cdot S \tag{12}$$

The velocity command generator section 6 in the position controller 4 performs velocity control and locus control regarding the traveling operation of the robot on the basis of the target position $\theta_{id}$, axis load factor ni and permissible interpolation travel velocity U.

The velocity control and locus control are exercised by sampling control. Namely, the following processing is carried out at certain time intervals $\Delta t$, generating the velocity command $d\theta_i$. First, the travel value $\Delta\theta_i$ of each axis is calculated from the target position $\theta_{id}$ and a preceding position command $\theta_{ic}$:

$$\Delta\theta_i = \theta_{id} - \theta_{ic} \tag{13}$$

An axis travel distance $L_i$ is then calculated by multiplying the travel value $\Delta\theta_i$ of each axis by the axis load factor $n_i$:

$$L_i = n_i \cdot \Delta\theta_i \tag{14}$$

For a given travel value $\Delta\theta_i$, the axis travel distance $L_i$ will be larger where the axis has a larger travel load (difficulty in moving), as indicated by a value of $n_i$ greater than 1.

A typical travel distance $L_m$ is then generated. Namely, the maximum value of the travel distance $L_i$ of each axis is defined as the typical travel distance $L_m$.

$$L_m = \max\{L_i\} \tag{15}$$

A travel velocity character dV in the next $\Delta t$ time is then calculated from the given acceleration velocity A and deceleration velocity D common to each axis and the permissible interpolation travel velocity U. That is, an acceleration region, a constant-velocity region or a deceleration region is judged on the basis of the typical travel distance Lm calculated per $\Delta t$ time, the permissible interpolation travel velocity U, the acceleration velocity A and the deceleration velocity D. When in the acceleration region, the travel velocity character dV in the next $\Delta t$ time is as follows:

$$dV = dV_c + A \tag{16}$$

where an initial value is zero.
When in the constant-velocity region:

$$dV = U \tag{17}$$

When in the deceleration region:

$$dV = dV - D \tag{18}$$

The velocity command $d\theta_i$ of each axis in the next $\Delta t$ time $d\theta_i$ is then be calculated from the velocity character dV common to each axis.

$$d\theta_i = dV \cdot \Delta\theta_i / L_m \tag{19}$$

The position command generator section 7 in the position controlling means 4 generates the position command $\theta_i$ of each axis in next $\Delta t$ time according to the velocity command $d\theta_i$:

$$\theta_i = \theta_{ic} + d\theta_i \tag{20}$$

The coordinate converter section 8 converts the position command $\theta_i$ into the number of drive motor pulses $J_i$ of each axis of the robot R and passes the result to the positioning controller section 9. The positioning controller section 9 outputs the number of drive motor pulses $J_i$ of each axis to each axis motor of the robot R via a built-in digital-to-analog converter.

The robot R repeats the above operation until the target position is reached, thereby completing the movement to the target position.

Figure 6:
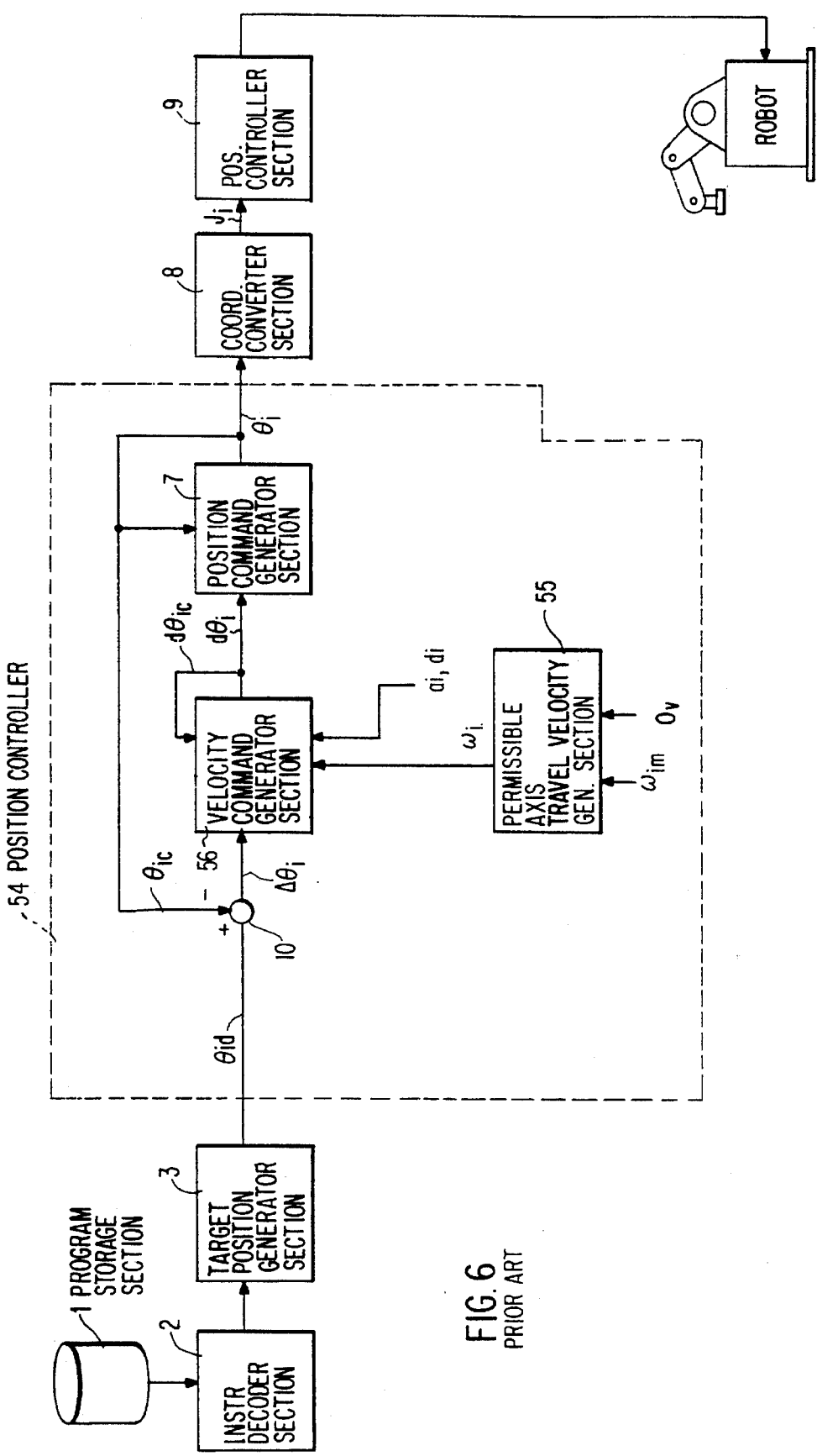
FIG. 6 is a block diagram of a robot controlling apparatus known in the art.

Among the expressions (10) to (20), expressions (11), (13), (14), (19) and (20) are all those of vector calculation, i.e. vector calculations need only be made a total of five times per axis at intervals of the sampling period. As compared to the conventional approach shown in FIG. 6, therefore, the number of calculations are reduced, requiring shorter processing time for a robot having many articulated axes.

Further, where target positions in a three-dimensional space represented by a cartesian coordinate system are to be generated or target positions in a three-dimensional space represented by a cylindrical coordinate system are to be generated from the target position generator 3 (interpolation in a three-dimensional space system), the robot can be controlled consistently.

A second feature of the invention will now be described with reference to FIG. 2. With this feature, the axes internal to the robot and additional axes external to the robot may be synchronized and commonly controlled.

Figure 2:
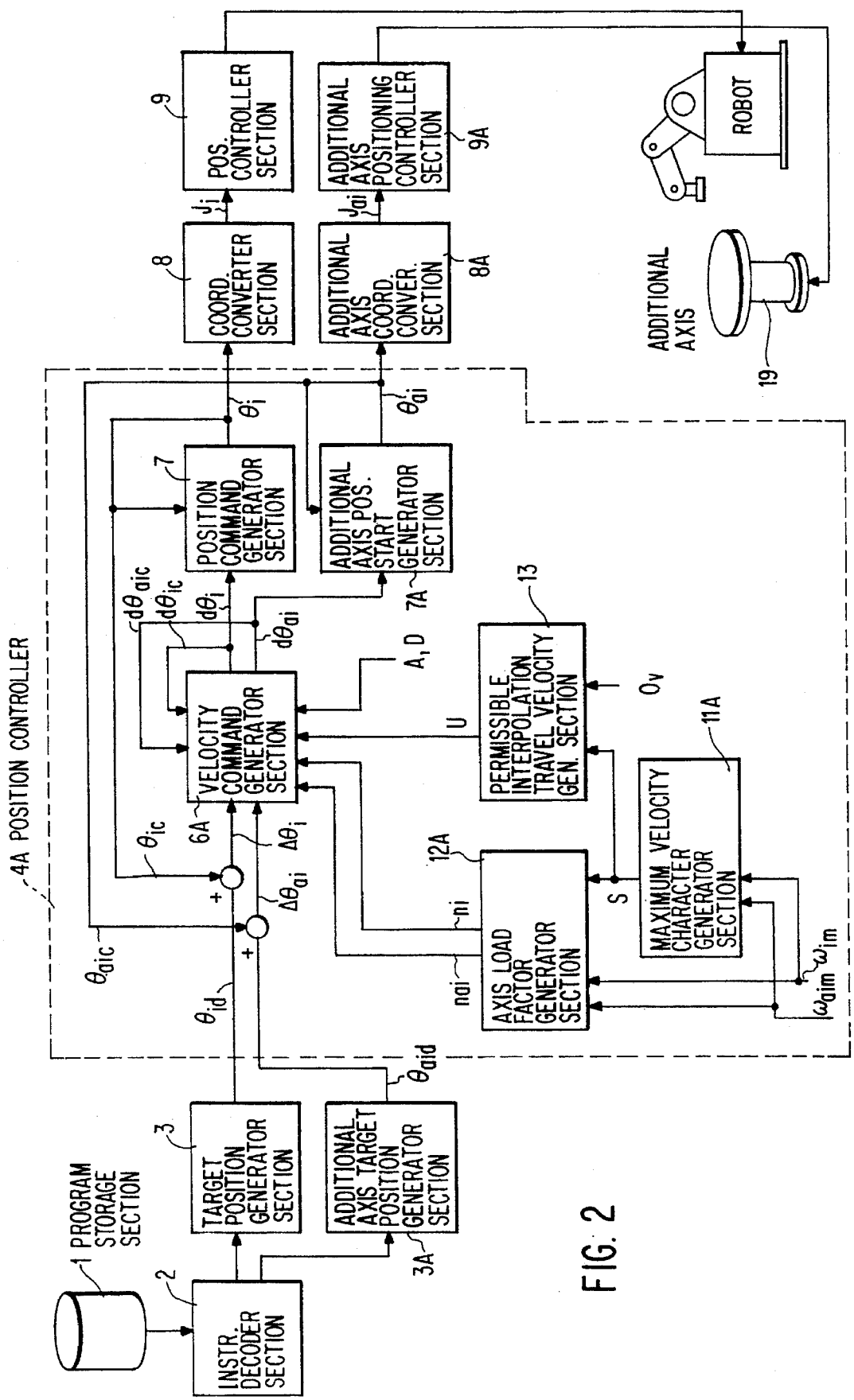
FIG. 2 is a block diagram of a robot controlling apparatus in accordance with a second preferred embodiment of the invention.

FIG. 2 shows the configuration of an embodiment of the invention with the feature, wherein 3A indicates an additional axis target position generator section for generating a position variable $\theta_{aid}$ which is the target position of an additional axis. The subscript a indicates a variable or value concerned with the additional axis, and i represents each of the robot and additional axes, e.g. i in $\theta_{id}$=1, 2, 3, 4, 5, 6 and i in $\theta_{aid}$=1, 2 for a six-axis robot having two additional axes.

Position controller 4A comprises a maximum velocity character generator section 11A for generating a maximum velocity character S, an axis load factor generator section 12A for generating the load factor $n_i$ of each robot axis and the load factor $n_{ai}$ of each additional axis, a permissible interpolation travel velocity generator section 13 for generating a permissible interpolation travel velocity U, a velocity command generator section 6A for generating a velocity command $d\theta_i$ for each robot axis and a velocity command $d\theta_{ai}$ for each additional axis at time intervals of $\Delta t$, a position command generator section 7 for generating a position command $\theta_i$ at time intervals of $\Delta t$ on the basis of the velocity command $d\theta_i$, and an additional axis position command generator section 7A for generating an additional axis position command $\theta_{ai}$ at time intervals of $\Delta t$ on the basis of the velocity command $d\theta_{ai}$. The position command calculating means comprises the position command generator section 7 and additional axis position command generator section 7A.

An additional axis coordinate converter section 8A is used for converting the additional axis position command $\theta_{ai}$ generated by the position controller 4A into the number of drive motor pulses $J_{ai}$ of each additional axis. An additional axis positioning controller section 9A is used for positioning each additional axis on the basis of the number of drive motor pulses $J_{ai}$.

The operation of the robot controlling apparatus according to the present embodiment will now be described. Referring to FIG. 2, when a program is selected to be run from among a plurality of programs stored in a program storage device 1, an instruction decoder section 2 starts decoding instructions in that program. When information obtained by the instruction decoding is an instruction concerned with the traveling operation of the robot, the instruction decoder section 2 commands the target position generator section 3 and additional axis target position generator section 3A to generate respective target positions $\theta_{id}$ and $\theta_{aid}$. This command causes the target position generator section 3 and additional axis target position generator section 3A to generate the target positions $\theta_{id}$ and $\theta_{aid}$.

The maximum velocity character generator section 11A in the position controller 4A obtains a maximum velocity character S from the maximum values of a maximum permissible axis angular velocity $\omega_{im}$ stipulated from the drive motor of each robot axis and a maximum permissible additional axis angular velocity $\omega_{aim}$ stipulated from the drive motor of each additional axis.

$$S=max\{\omega_{im}, \omega_{aim}\} \tag{21}$$

The axis load factor generator section 12A in the position controlling means 4A calculates a robot axis load factor $n_i$ and an additional axis load factor $n_{ai}$ from the maximum permissible axis angular velocity $\omega_{im}$, maximum permissible additional axis angular velocity $\omega_{aim}$ and maximum velocity character S.

$$n_i=S/\omega_{im} \tag{22}$$

$$n_{ai}=S/\omega_{aim} \tag{23}$$

The axis load factors $n_i$ and $n_{ai}$ are non-dimensional quantities, each representing a travel load (difficulty in moving) in the travel of each axis.

The permissible interpolation travel velocity generator section 13 in the position controlling means 4A calculates a permissible interpolation travel velocity U from the maximum velocity character S and an override factor $O_v$.

$$U=O_v S \tag{24}$$

The velocity command generator section 6A in the position controlling means 4A performs velocity control and locus control related to the traveling operation of the robot on the basis of the target positions $\theta_{id}$ and $\theta_{aid}$, axis load factors $n_i$ and $n_{ai}$, and permissible interpolation travel velocity U. The velocity control and locus control are carried out by sampling control. That is, the following processing is performed at certain time intervals $\Delta t$, generating the velocity commands $d\theta_i$, $d\theta_{ai}$.

First, the travel value $\Delta\theta_i$ of each robot axis is calculated from the target position $\theta_{id}$ and a preceding position command $\theta_{ic}$:

$$\Delta\theta_i=\theta_{id}-\theta_{ic} \tag{25}$$

Similarly, the travel value is also calculated for each additional axis:

$$\Delta\theta_{ai}=\theta_{aid}-\theta_{aic} \tag{26}$$

Axis travel distances $L_i$, $L_{ai}$ are then calculated by multiplying the travel values $\Delta\theta_i$, $\Delta\theta_{ai}$ of each axis by the axis load factors $n_i$, $n_{ai}$, respectively:

$$L_i=n_i \cdot \Delta\theta_i \tag{27}$$

$$L_{ai}=n_{ai} \cdot \Delta\theta_{ai} \tag{28}$$

For given travel values $\Delta\theta_i$ or $\Delta\theta_i$, the axis travel distances $L_i$, $L_{ai}$ become larger as the axes have a larger travel load (difficulty in moving).

A typical travel distance $L_m$ is then generated.

$$L_m=max\{L_i, L_{ai}\} \tag{29}$$

A travel velocity character dV in the next $\Delta t$ time is then calculated from the given acceleration velocity A and deceleration velocity D of each axis and the permissible interpolation travel velocity U. Namely, an acceleration region, a constant-velocity region or a deceleration region is judged on the basis of the typical travel distance $L_m$ calculated per $\Delta t$ time, the permissible interpolation travel velocity U, the acceleration velocity A and the deceleration velocity D. When in the acceleration region, the travel velocity character dV in the next $\Delta t$ time is as follows:

$$dV=dV_c+A \tag{30}$$

where an initial value is zero.
When in the constant-velocity region:

$$dV=U \tag{31}$$

When in the deceleration region:

$$dV=dV_c-D \tag{32}$$

The travel velocity $d\theta_i$ of each axis and travel velocity $d\theta_{ai}$ of each additional axis in next $\Delta t$ time are then calculated from the velocity character $dV$ common to each axis:

$$d\theta_i = dV \cdot \Delta\theta_i / L_m \quad (33)$$

$$d\theta_{ai} = dV \cdot \Delta\theta_{ai} / L_m \quad (34)$$

The position command generator section 7 in the position controlling means 4 generates the position command $\theta_i$ of each axis in next $\Delta t$ time according to the velocity command $d\theta_i$:

$$\theta_i = \theta_{ic} + d\theta_i \quad (35)$$

Similarly, the additional axis position command generator section 7A generates the additional axis position command $\theta_{ai}$ in next $\Delta t$ time according to the additional axis velocity command $d\theta_{ai}$:

$$\theta_{ai} = \theta_{aic} + d\theta_{ai} \quad (36)$$

The coordinate converter section 8 converts the position command $\theta_i$ into the number of drive motor pulses $J_i$ of each axis of the robot and passes the result to the positioning controller section 9, which then outputs the number of drive motor pulses $J_i$ of each axis to each axis of the robot via a built-in digital-to-analog converter.

Similarly, the additional axis coordinate converter section 8A converts said additional axis position command $\theta_{ai}$ into the number of drive motor pulses $J_{ai}$ of each additional axis and passes the result to the additional axis positioning controller section 9A, which then outputs the number of additional axis drive motor pulses $J_{ai}$ to each additional axis via the built-in digital-to-analog converter.

The robot and additional axes repeat the above operation until the target positions are reached, thereby completing the movement to the target positions.

Since the present embodiment has the maximum velocity character for velocity control and includes the load factor vector of each operating axis calculated on the basis of the maximum velocity character as described above, a typical travel distance $L_m$ and a travel velocity $v$ can be calculated and velocity interpolation can be performed on the basis of such calculations, which not only simplifies processing and reduces processing time but also facilitates synchronous control of the additional axes with the robot axes when the robot and additional axes are to be controlled simultaneously.

Further features of third and fourth embodiments will now be described with reference to FIGS. 3 to 5. In addition to the robot controlling apparatus of the first embodiment shown in FIG. 1, the third embodiment includes an axis load factor changing section for changing the axis load factors $n_i$ and/or $n_i$ on the basis of axis interference information, thereby allowing control to be exercised to cope with axis interference in a plurality of robot axes.

Figure 3:
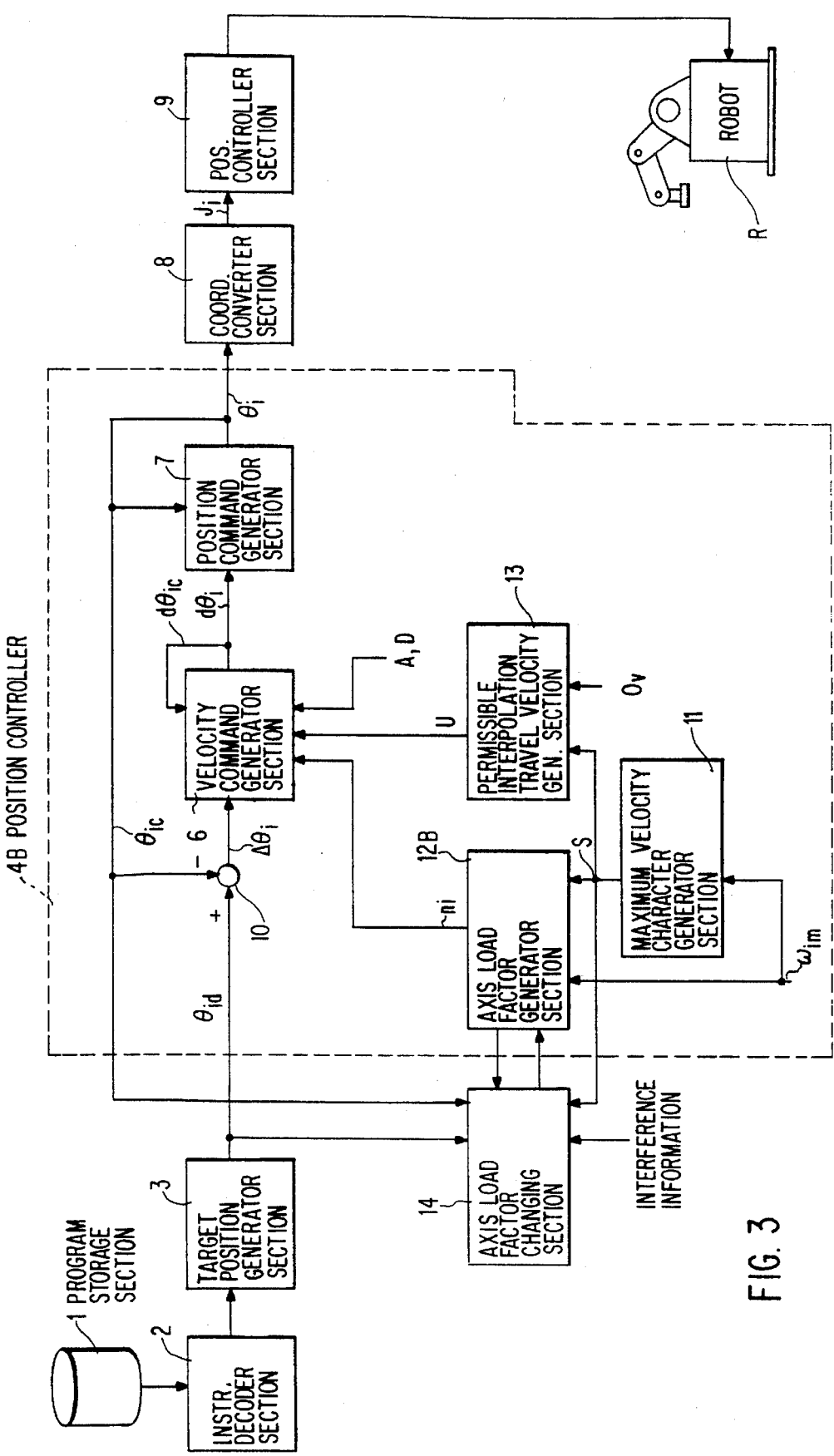
FIG. 3 is a block diagram of a robot controlling apparatus in accordance with third and fourth preferred embodiments of the invention.

FIG. 3 is a block diagram illustrating the arrangement of a robot controlling apparatus of the third embodiment. This robot controlling apparatus is different from the one shown in FIG. 1 in that axis load factors $n_i$ generated by the axis load factor generator section 12B in the position controlling means 4B are changed by the axis load factor changing section 14, serving as an axis load factor changing means. Axis interference information is entered into the axis load factor changing section 14.

Figure 4:
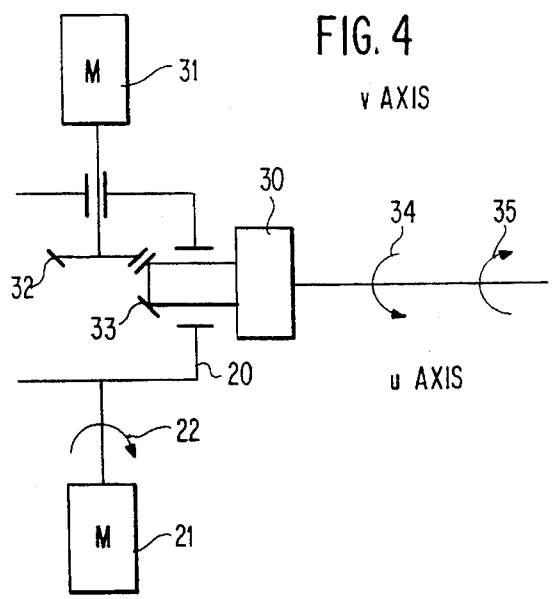
FIG. 4 is a diagrammatic mechanism view of axis interference in two axes.

Axis interference takes place in a joint having a mechanism as shown in FIG. 4, which is a diagrammatic mechanism view of axis interference. Referring to FIG. 4, 20 indicates a u axis, 21 a u-axis drive motor, 30 a v axis, 31 a v-axis drive motor, and 32 and 33 bevel gears for transmitting the rotation of the v-axis drive motor 31 to the v axis 30.

When the u axis 20 is rotated in the direction of an arrow 22 in the illustrated articulated mechanism, the v axis 30 rotates in the direction of an arrow 34 if the v-axis drive motor 31 is kept stopped. Namely, the rotation of the u axis 20 in the direction of the arrow 22 is added as the rotation of the v axis 30 in the direction of the arrow 34. Hence, a permissible velocity for rotating the v axis 30 by the v-axis drive motor 31 varies according to the velocity of the u axis 20, as indicated in an axis velocity relation diagram of FIG. 5.

That is, the permissible velocity $v$ of the v axis 30 is as follows, assuming that the directions of the arrows 22 and 34 are positive:

$$v = p \cdot u \pm vo \quad (37)$$

where p is an interference factor, u is a u axis velocity, and vo is the permissible velocity of the v axis at the u axis velocity of zero. The p and vo in the expression (37) are the axis interference information. It should be noted that supposing the permissible velocity of the u axis 20 is uo, a velocity (u, v) must be within the region of a parallelogram in FIG. 5.

The axis load factor changing section 14 calculates $\Delta\theta_i$ and $L_m$ according to previously described expression (13):

$$\Delta\theta_i = \theta_{id} - \theta_{ic}$$

and expression (15):

$$L_m = max\{L_i\}$$

Further, assuming that axis identifier (i) of interferable axes are $\alpha$ and $\beta$, the velocity commands u and v of the interferable axes $\alpha$ and $\beta$ are calculated by the following expressions:

$$u = S \cdot \Delta\theta_\alpha / L_m \quad (38)$$

$$v = S \cdot \Delta\theta_\beta / L_m \quad (39)$$

Figure 5:
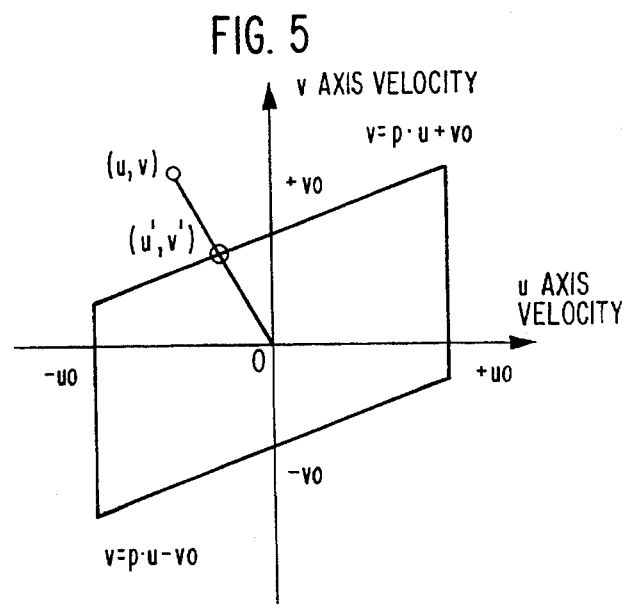
FIG. 5 is an axis velocity relation diagram where axis interference takes place.
Figure 7:
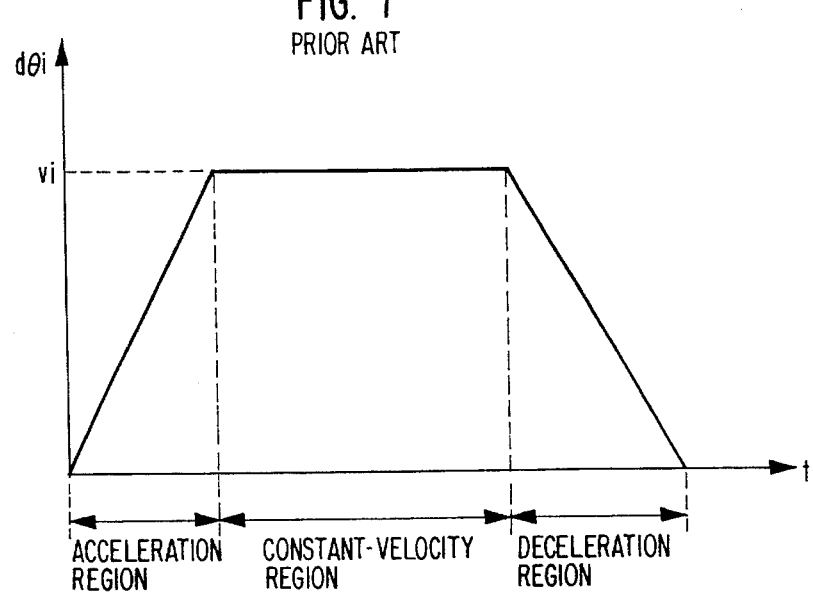
FIG. 7 illustrates the acceleration/deceleration control of the robot controlling apparatus shown in FIG. 6.

It is then checked whether or not the velocity commands u, v calculated are within the region of the parallelogram shown in FIG. 5. If they are within the parallelogram region, the axis load factors $n_i$ are not changed. If they are not within the parallelogram region, velocity commands u', v' falling within the parallelogram region are found.

The velocity commands u', v' can be found in the following way. For example, if the travel velocity is as indicated by (u, v) in FIG. 5, (u, v) is reduced toward the zero (0, 0) and a velocity (u', v') falling within the parallelogram region is adopted. Alternatively, a perpendicular is dropped from (u, v) to the side of the parallelogram and a velocity (u', v') located on that side is adopted.

Then, supposing that the load factors of the interferable axes $\alpha$, $\beta$ are $n_\alpha$ and $n_\beta$, respectively, $n_\alpha'$ and $n_\beta'$ are calculated by the following expressions:

$$n_\alpha' = |u/u'| \cdot n_\alpha \quad (40)$$

$$n_\beta' = |v/v'| \cdot n_\beta \quad (41)$$

A command is then given to the axis load factor generator section 12 to change the load factors $n_\alpha$, $n_\beta$ of the interferable axes $\alpha$, $\beta$ into $n_\alpha'$, $n_\beta'$.

By employing the new axis load factors $n_i$, the velocity commands $d\theta_i$ falling within the parallelogram region are automatically generated, and if the robot includes interferable axes, it can carry out smooth velocity control easily.

While the present embodiment described above has the axis factor changing section 14 added to the robot controlling apparatus shown in FIG. 1 to change the axis load factors of a plurality of axes of the robot R in the axis load factor changing section 14 to cope with axis interference, an identical effect can be produced on a robot which includes additional axes to the robot axes shown in FIG. 2 by the addition of an axis load factor changing section for the additional axes which exercise similar control.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiments has been made only by way of example and that numerous changes in the details and arrangement of components may be made without departing from the spirit and scope of the invention as hereinafter claimed.

What is claimed is:

1. A robot controlling apparatus comprising:
   (a) a position controller that outputs a series of position commands for each axis of a robot according to an input of target position information for each said axis, said position controller comprising:
   a source that outputs a maximum velocity character indicative of a baseline velocity value and a source that outputs a travel velocity character profile composed exclusively of scalar parameters;
   a load factor generating section coupled to said maximum velocity character output source, said load factor generating section generating a respective load factor for each said axis on the basis of an axis angular velocity for each said axis and the maximum velocity character;
   a velocity command generator coupled to said load factor generating section and said travel velocity character profile output source and responsive to at least the respective load factor and the travel velocity character profile, said velocity command generator generating, for each said axis, a velocity command; and
   a position command generator coupled to said velocity command generator and responsive to the velocity command, said position command generator generating the series of position commands for each said axis; and
   (b) a controller section coupled between said position controller and said robot, said controller section controlling each said axis of said robot in accordance with the series of position commands.

2. The robot controlling apparatus of claim 1, wherein said position controller further comprises:
   a first calculator coupled with said travel velocity character profile output source, said first calculator calculating, from the maximum velocity character, a factored velocity value, representing a permissible interpolation travel velocity, on the basis of an override factor; and
   a second calculator, which calculates a differential travel value on the basis of the target position information and a preceding one of the series of position commands along each said axis; and
   wherein said velocity command generator is responsive additionally to the differential travel value and the factored velocity value for each said axis.

3. The robot controlling apparatus of claim 1 wherein said apparatus further comprises load factor changing section coupled to said load factor generating section, said changing section changing the load factor for at least one axis.

4. The robot controlling apparatus of claim 1 wherein said travel velocity character profile output source is programmed to output travel velocity character profiles that are identical for plural axes.

5. A method of controlling a robot system comprising a robot having a plurality of movement axes and a position controlling means for outputting a series of position commands for each movement axis of the robot according to an input of target position information of each said movement axis, said method comprising the steps of:
   generating a maximum velocity character indicative of a baseline velocity value and generating a travel velocity character profile composed exclusively of scalar parameters;
   generating a respective load factor for each said movement axis on the basis of an axis angular velocity for each said movement axis and the maximum velocity character;
   generating a respective velocity command for each said movement axis in response to at least the respective load factor and the travel velocity character profile;
   generating the series of position commands for each said movement axis in response to the respective velocity command; and
   controlling the plurality of movement axes of the robot in accordance with the series of position commands for each movement axis.

6. The robot controlling method of claim 5 wherein said method further comprises the steps of:
   calculating a factored velocity value representing a permissible interpolation travel velocity on the basis of an override factor; and
   calculating a differential travel value on the basis of the target position information and a preceeding one of the series of position commands along each said movement axis; and
   wherein said respective velocity command generating step is additionally responsive to the differential travel value and the factored velocity value for each said movement axis.

7. The robot controlling method of claim 5 wherein said respective load factor generating step further comprises changing the load factor for at least one of said movement axes.

8. The robot controlling method of claim 5 wherein said step of generating the travel velocity character profile generates travel velocity character profiles identical for plural ones of said movement axes.

* * * * *